(12) United States Patent
Israney

(10) Patent No.: US 11,235,239 B2
(45) Date of Patent: Feb. 1, 2022

(54) COMPUTER DEVICE AND COMPUTER IMPLEMENTED METHOD

(71) Applicant: KING.COM LIMITED, St. Julians (MT)

(72) Inventor: Krishna Israney, Berlin (DE)

(73) Assignee: KING.COM LTD., St. Julians (MT)

(*) Notice: Subject to any disclaimer, the term of this patent is extended or adjusted under 35 U.S.C. 154(b) by 32 days.

(21) Appl. No.: 16/787,794

(22) Filed: Feb. 11, 2020

(65) Prior Publication Data

US 2020/0254342 A1    Aug. 13, 2020

Related U.S. Application Data

(60) Provisional application No. 62/803,787, filed on Feb. 11, 2019.

(51) Int. Cl.
| | | |
|---|---|---|
| *A63F 13/52* | (2014.01) | |
| *A63F 13/822* | (2014.01) | |
| *A63F 13/53* | (2014.01) | |
| *A63F 13/23* | (2014.01) | |

(52) U.S. Cl.
CPC .............. *A63F 13/52* (2014.09); *A63F 13/23* (2014.09); *A63F 13/53* (2014.09); *A63F 13/822* (2014.09); *A63F 2300/308* (2013.01)

(58) Field of Classification Search
CPC ............................... A63F 13/52; A63F 13/795
See application file for complete search history.

(56) References Cited

U.S. PATENT DOCUMENTS

| | | | | |
|---|---|---|---|---|
| 2002/0107062 | A1* | 8/2002 | Wong ..................... | A63F 13/00 463/9 |
| 2010/0083165 | A1* | 4/2010 | Andrews ............... | G06F 1/1626 715/784 |
| 2013/0310150 | A1* | 11/2013 | Mishina ................. | A63F 13/87 463/23 |
| 2014/0024437 | A1* | 1/2014 | Vann .................... | G07F 17/3279 463/25 |
| 2017/0072297 | A1* | 3/2017 | Lehwalder ............ | A63F 13/537 |
| 2017/0103617 | A1* | 4/2017 | Navon ................... | A63F 3/02 |
| 2020/0261802 | A1* | 8/2020 | Zhuang ................. | A63F 13/92 |

OTHER PUBLICATIONS

"Beat the Jelly Queen", YouTube; Retrieved from the Internet; URL: https://www.bing.com/videos/search?q=candy+crush+jelly+saga+queen&view=detail&mid=6B5AB606AF08A17B7DE86B5AB606AF08A17B7DE8&FORM=VIRE; (Jan. 24, 2018) retrieved on Aug. 22, 2021.

* cited by examiner

*Primary Examiner* — James S. McClellan
(74) *Attorney, Agent, or Firm* — Saul Ewing Arnstein & Lehr LLP

(57) ABSTRACT

A computer device has a display, a user interface, and at least one processor. The processor is configured to provide a game board of a computer implemented game. The game board comprising a first dedicated area associated with a first player and a second dedicated area associated with a second player. When it is the first player's turn, the processor is configured to cause the display to display the first dedicated area and the common area. When it is the second player's turn, the processor is configured to cause the display to display the second dedicated area and the common area.

19 Claims, 14 Drawing Sheets

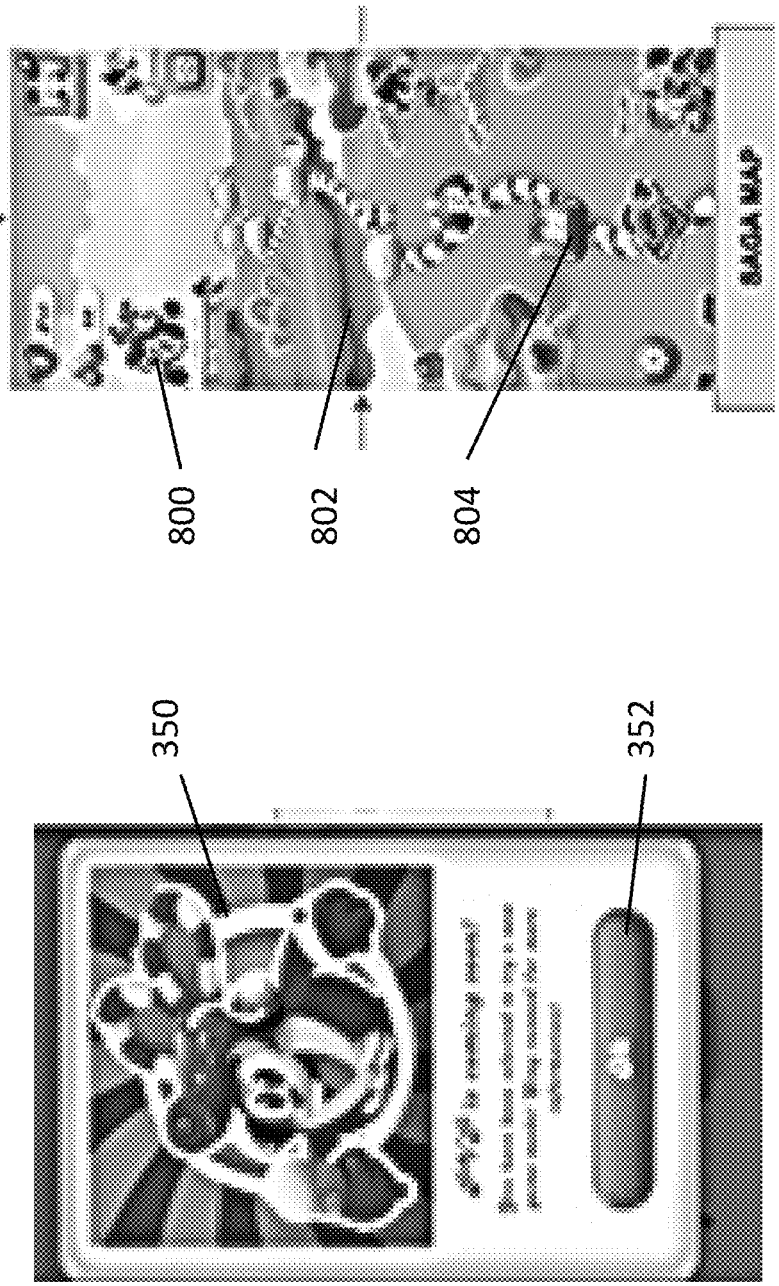

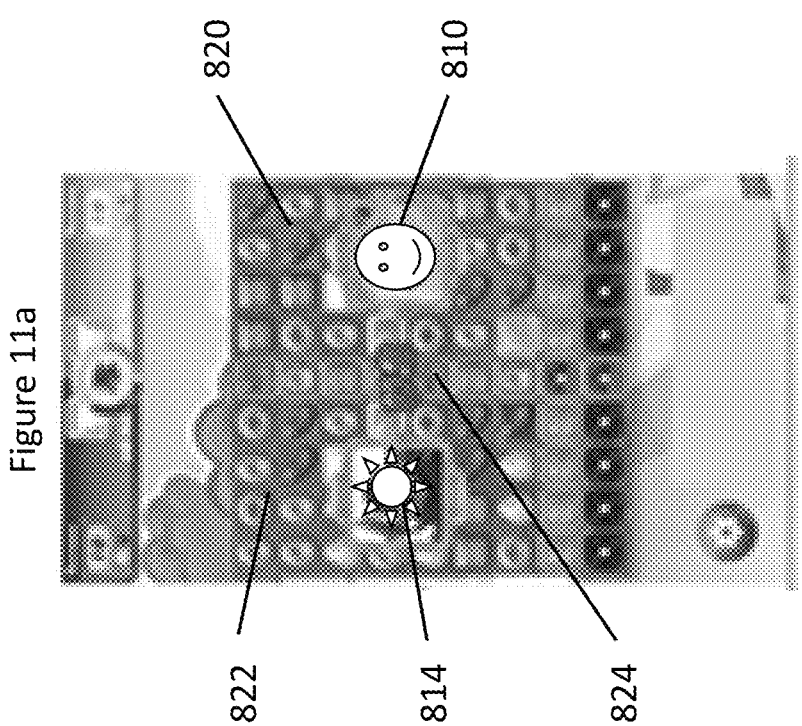

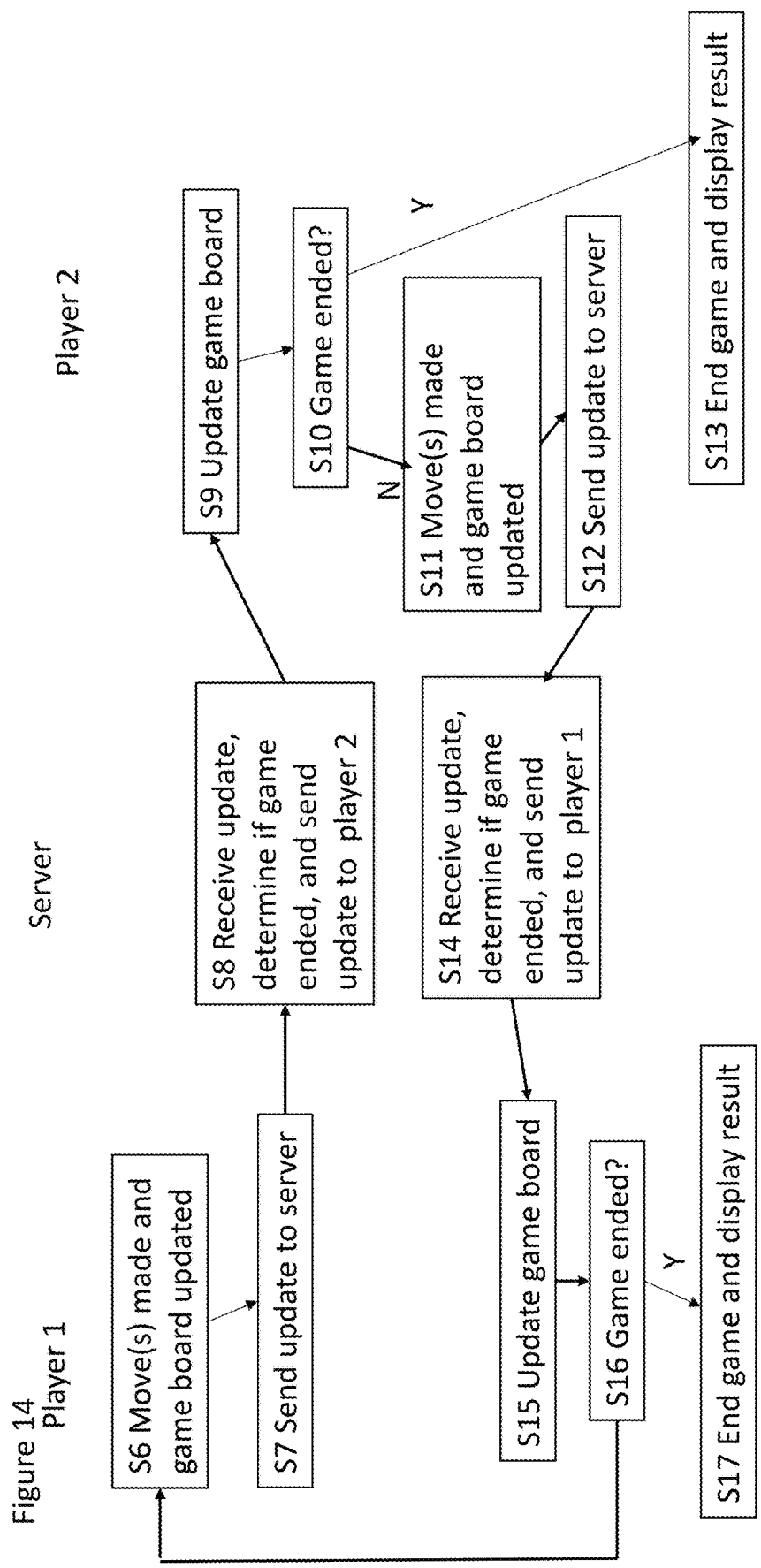

COMPUTER DEVICE AND COMPUTER IMPLEMENTED METHOD

CROSS-REFERENCE TO RELATED APPLICATIONS

This application claims priority to U.S. Provisional Application No. 62/803,787, filed on Feb. 11, 2019, the entire contents of which being fully incorporated herein by reference.

FIELD OF THE INVENTION

Embodiments of this application relate to a user device and server for use in playing a computer implemented game. Some embodiments may relate to engaging users or players in a computer game executable in an online environment.

BACKGROUND OF THE INVENTION

In the field of computer-implemented games, there are many technical challenges facing the designer of such games when considering how, for example, the user interface is to be controlled in the context of computer devices available to play the game.

One technical challenge can involve providing competitive game play against other opponents in the context of a casual social game.

Another significant challenge is that of user engagement. Engagement involves designing gameplay to be engaging and rewarding to players in the context of a competitive scenario. This may typically requires games to be easily understood at their simplest or introductory levels, providing rewarding gameplay with quite simple game mechanics, but being more challenging and varied so that the players who are playing against each other remain engaged with the game and do not leave before a competitive game has been completed.

Effective engagement requires various forms of feedback to reinforce a player's sense of success and accomplishment.

A common genre of casual games is so-called match games. This is a type of tile-matching game where the player manipulates game elements according to a matching criterion.

A match-three game is a type of casual puzzle game where the player is required to find patterns on a seemingly chaotic board. The player then has to match three or more of the same type of game element on the game board and those matched elements will then be removed from the game board.

An existing type of match-three game is a so-called "switcher" game. In a switcher game, the player switches the place of two adjacent game elements on the game board so that one or both of them create a chain of at least three adjacent game elements of the same type. Those matched game elements will then be removed from the game board. The game board is then repopulated with game elements.

Another known type of game is "linker game", where a sequence of game elements are linked to form a known sequence.

Another type of game is a 'clicker' game, in which matches can be made in a board by clicking a group of adjacent game elements.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device comprising a display, a user interface, and at least one processor, the at least one processor being configured to: provide a game board of a computer implemented game, the game board comprising a first dedicated area associated with a first player using the computer device and a second dedicated area associated with a second player using a different computer device and a common area; determine that it is a turn of the first player to make a move in the computer implemented game; cause the display to display a first game board area for the first player comprising the first dedicated area and at least a part of the common area when it is determined that it is the first player's turn; determine that it is a turn of the second player to make a move in the computer implemented game; and cause the display to display a second game board area for the second player comprising the second dedicated area and at least a part of the common area when it is determined that it is the second player's turn, the second game board area being different to the first game board area The first game board area may comprise all of the common area.

The second game board area may comprise all of the common area.

The user interface may be configured to receive at least one user input causing a move from the first player in the first game board area, the at least one processor configured in response to the at least one user input to cause the display to display the game board area.

The at least one processor may be configured to cause the display to display the common area between the first dedicated area and the second dedicated area.

The at least one processor may be configured to cause the display to pan across the game board at a beginning of the computer implemented game.

The at least one processor may be configured to cause the display to display information indicating which area of the game board is associated with which of the first and second players.

The at least one processor may be configured to cause the display to pan from showing the first dedicated area to the second dedicated area.

The at least one processor may be configured when a turn of one of the first and second players is completed to cause the image displayed on the display to pan from showing the first dedicated area to the second dedicated area.

The at least one processor may be configured to cause the display to initially display only a part of the first dedicated area and only a part of the second dedicated area.

The at least one processor may be configured to cause the display to display information indicating if it is the first player's turn or the second player's turn.

The game board may have a plurality of game elements, each game element comprising one of a plurality of different characteristics, the user interface may be configured to receive an input from the first player when it is the first player's turn to select at least one game element and the at least one processor may be configured to determine based on the selected at least one game element if a valid move has been made.

The at least one processor may be configured to determine that an invalid move has been made when the at least one selected game element is determined to be provided in the second dedicated area.

At least some of the plurality of game elements may be associated with a tile and when a valid move satisfies one or more conditions, the at least one processor is configured to cause the tile to be provided with a given characteristic.

The given characteristic may be a first characteristic in the first dedicated area and a second characteristic in the second dedicated area.

The given characteristic may be either of the first characteristic or the second characteristic in the common area.

The at least one processor may be configured to determine if it is the first player's turn or the second player's turn and in dependence on this determination, determine if the given characteristic is the first characteristic or the second characteristic in the common area.

The user interface may be configured to receive at least one input to select at least one game object and deploy the game object on the game board.

The game object when deployed may at least one of assists the first player when playing the computer implemented game and hinders the second player when playing the computer implemented game.

The at least one processor may be configured to determine that the game object is to be deployed in the second dedicated area and in response cause the display to display at least the second dedicated area.

The at least one processor may be configured to determine that the game object is to be deployed in the second dedicated area in dependence on one or more characteristics of the game object.

According to another aspect, there is provided a computer device comprising a display, a user interface, and at least one processor, the at least one processor being configured to: provide a game board of a computer implemented game, the game board comprising a first dedicated area associated with a first player using the computer device and a second dedicated area associated with a second player using a different computer device and at least one common area; cause the display to display the first dedicated area and at least a part of the at least one common area but not at least a part of the second dedicated area when it is the first player's turn; and cause the display to display the second dedicated area and at least a part of the at least one common area but not at least a part of the first dedicated area when it is the second player's turn.

At least one common area may be provided between the first dedicated area and the second dedicated area.

The at least one processor may be configured to cause the display to initially pan across the game board.

The at least one processor may be configured to cause the display to initially pan across the game board and to cause the display to display information indicating which area of the game board is associated with which of the first and second players.

The at least one processor may be configured to cause the display to initially pan from showing the dedicated area of one of the first and second players and the common area to showing the dedicated area of the other of the first and second players and the common area.

The at least one processor may be configured to cause the display to initially pan from showing the dedicated area of one of the first and second players and the common area to showing the dedicated area of the other of the first and second players and the common area and to cause the display to display information indicating which area is associated with which of the first and second players.

The at least one processor may be configured when a turn of one of the first and second players is completed to cause the image displayed on the display to pan from showing the dedicated area of the one of the first and second players and the common area to showing the dedicated area of the other of the first and second players and the common area.

The at least one processor may be configured to cause the display to initially display only a part of the first dedicated area, the at least one common area and only a part of the second dedicated area.

The at least processor may be configured to cause the display to display information indicating that the first player is associated with the first dedicated area and the second player is associated with the second dedicated area.

The at least one processor may be configured to cause the display to display information indicating that if it is the first player's turn or the second player's turn.

The game board may comprise a plurality of game elements, each game element comprising one of a plurality of different characteristics, the user interface being configured to receive an input from the first player when it is the first player's turn to select at least one game element and the at least one processor is configured to determine based on the selected at least one game element if a valid move has been made.

At least some of the plurality of game elements are associated with a tile and when a valid move satisfies one or more conditions, the at least one processor is configured to cause the tile to be provided with a given characteristic.

The given characteristic may be a first characteristic in the first dedicated area and a second characteristic in the second dedicated area. The given characteristic may be a given color.

The given characteristic may be either of the first characteristic and the second characteristic in the common area.

The given characteristic in the common area may be dependent on if it is the first player's turn or the second player's turn.

At least one game object may be provided, the user interface being configured to receive at least one input to select one of the at least one game object and deploy the game object on the game board.

The game object when deployed may assist the first player when playing the computer implemented game or hinder the second player when playing the computer implemented game.

The at least one processor may be configured to determine that the game object is to be deployed in the second dedicated area and in response cause the display to display at least the second dedicated area.

The at least one processor may be configured to determine that the game object is to be deployed in the second dedicated area in dependence on one or more characteristics of the game object.

The at least one processor is configured to start a timer when a turn of a player starts and to end the turn when the timer one of reaches a given time and expires.

A turn may comprise a predetermined number of moves.

The predetermined number of moves may be two.

According to another aspect, there is provided a computer implemented method provided on a computer device, the method comprising: providing, by at least processor of the computer device, a game board of a computer implemented game, the game board comprising a first dedicated area associated with a first player using the computer device and a second dedicated area associated with a second player using a different computer device and at least one common area; causing, by the at least one processor, a display of the computer device to display the first dedicated area and at least a part of the at least one common area but not at least a part of the second dedicated area when it is the first player's turn; and causing, by the at least one processor, the display of the computer device to display the second dedicated area and at least a part of the at least one common area but not at least a part of the first dedicated area when it is the second player's turn.

At least one common area may be provided between the first dedicated area and the second dedicated area.

The method may comprise causing, by the at least one processor, the display to initially pan across the game board.

The method may comprise causing, by the at least one processor, the display to initially pan across the game board and the display to display information indicating which area of the game board is associated with which of the first and second players.

The method may comprise causing, by the at least one processor, the display to initially pan from showing the dedicated area of one of the first and second players and the common area to showing the dedicated area of the other of the first and second players and the common area.

The method may comprise causing, by the at least one processor, the display to initially pan from showing the dedicated area of one of the first and second players and the common area to showing the dedicated area of the other of the first and second players and the common area and to display information indicating which area is associated with which of the first and second players.

The method may comprise causing, by the at least one processor, when a turn of one of the first and second players is completed the image displayed on the display to pan from showing the dedicated area of the one of the first and second players and the common area to showing the dedicated area of the other of the first and second players and the common area.

The method may comprise causing, by the at least one processor, the display to initially display only a part of the first dedicated area, the at least one common area and only a part of the second dedicated area.

The method may comprise causing, by the at least one processor, the display to display information indicating that the first player is associated with the first dedicated area and the second player is associated with the second dedicated area.

The method may comprise causing, by the at least one processor, the display to display information indicating that if it is the first player's turn or the second player's turn.

The game board may comprise a plurality of game elements, each game element comprising one of a plurality of different characteristics, and the computer implemented method may comprise receiving via a user interface of the computer device an input from the first player when it is the first player's turn to select at least one game element and determining, by the at least one processor, based on the selected at least one game element if a valid move has been made.

At least some of the plurality of game elements are associated with a tile and when a valid move satisfies one or more conditions, method may comprise causing, by the at least one processor a tile to be provided with a given characteristic.

The given characteristic may be a first characteristic in the first dedicated area and a second characteristic in the second dedicated area. The given characteristic may be a given color.

The given characteristic may be either of the first characteristic and the second characteristic in the common area.

The given characteristic in the common area may be dependent on if it is the first player's turn or the second player's turn.

The method may comprise, receiving via the user interface at least one input to select one of at least one game objects and deploy the game object on the game board.

The game object when deployed may assist the first player when playing the computer implemented game or hinder the second player when playing the computer implemented game.

The method may comprise determining, by the at least one processor, that the game object is to be deployed in the second dedicated area and in response causing the display to display at least the second dedicated area.

The method may comprise determining, by the at least one processor, that the game object is to be deployed in the second dedicated area in dependence on one or more characteristics of the game object.

The method may comprise starting, by the at least one processor, a timer when a turn of a player starts and ending the turn when the timer one of reaches a given time and expires.

A turn may comprise a predetermined number of moves.

The predetermined number of moves may be two.

According to some aspects, there is provided a program product comprising a computer-readable storage device including a computer-readable program for providing a computer-implemented game, wherein the computer-readable program when executed on a computer causes the computer to perform any one or more of the method steps described previously.

According to another aspect, there is provided a computer readable non-transitory storage medium carrying one or more computer executable instructions which when run on at least one processor causes any one or more of the method steps described previously to be performed.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF THE DRAWINGS

By way of example only, some embodiments will now be described with reference to the following Figure in which:

FIG. 7 shows an image displayed indicating a player vs player PvP mode availability;

FIG. 8 shows an example of a representation of different levels which also provides a PvP option;

FIG. 11a shows an example of a game board displayed at a beginning of a PvP mode;

FIG. 14 shows a method of some embodiments to play in a PvP mode.

DETAILED DESCRIPTION

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing form the scope of the present invention.

A person skilled in the art will realise that the different approaches to implementing the game is not exhaustive, what is described herein are certain preferred embodiments. It is possible to implement the game in a number of variations.

Figure 1:
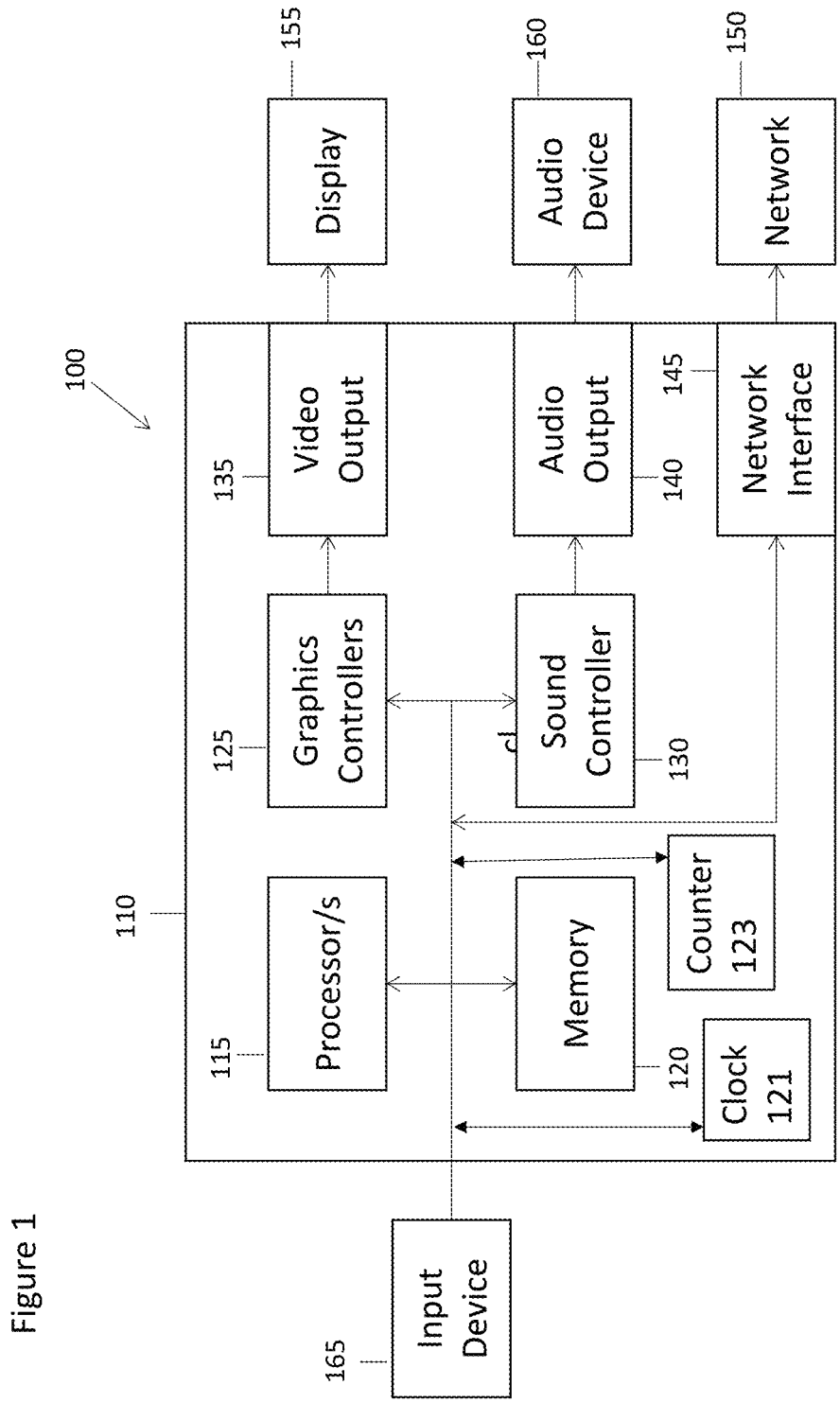
FIG. 1 shows a schematic view of a user device.

A schematic view of a user device 100 according to an embodiment is shown in FIG. 1. All of the blocks shown are implemented by suitable circuitry. The blocks may be implemented in hardware and/or software. The user device may have a control part 110 which may be provided by one or more processors 115 and at least one memory 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

Optionally a counter 123 is provided. This may be implemented in hardware, software or by a combination of the two. The counter may be provided by the at least one processor in some embodiments. The counter may be used to count a number of moves made, a number of moves remaining and/or the like.

Optionally, a clock 121 and/or timer function is provided. This may be implemented in hardware, software or by a combination of the two. The clock and/or timer function may be provided by the at least one processor in some embodiments. The timer function may be used to control an amount of time available for a user to make a move and/or the like.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
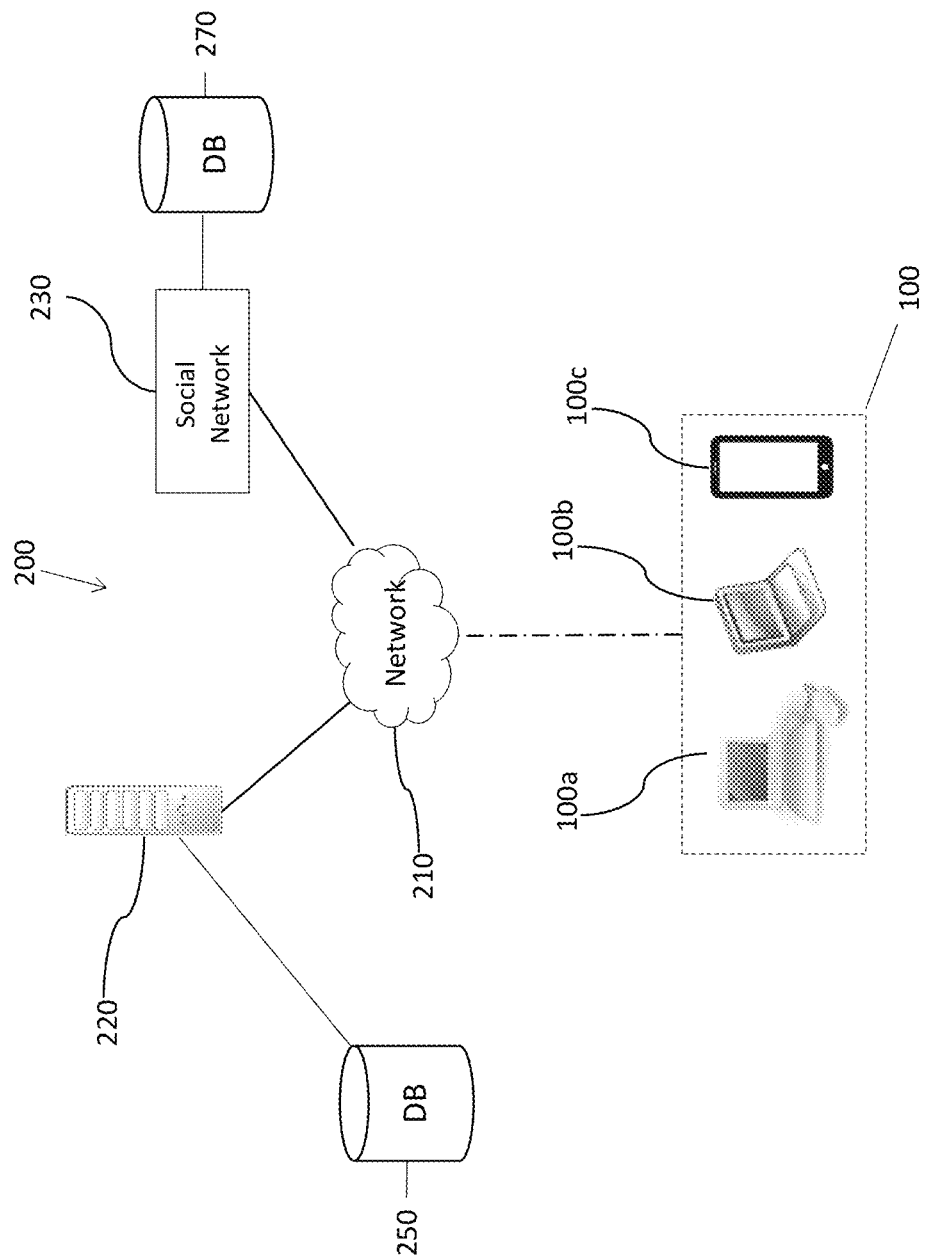
FIG. 2 shows an example computer environment.

FIG. 2 schematically shows a system 200 according to an embodiment. The system 200 comprises a server 220 which may store or be in communication with database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

The server 220 may communicate via, for instance, the internet 210 to one or more client or user devices 100, shown in FIG. 2 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. It should be appreciated, however, that such an approach does not necessarily require the use of the Internet. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game.

One example of a game with which embodiments may be used is a 'match-3 game' where the player is required to find patterns on a seemingly chaotic board. The player then has to match three or more of the same type of game element on the game board and those matched elements will then disappear. In some games the user has to match more than 3 game elements.

Figure 3:
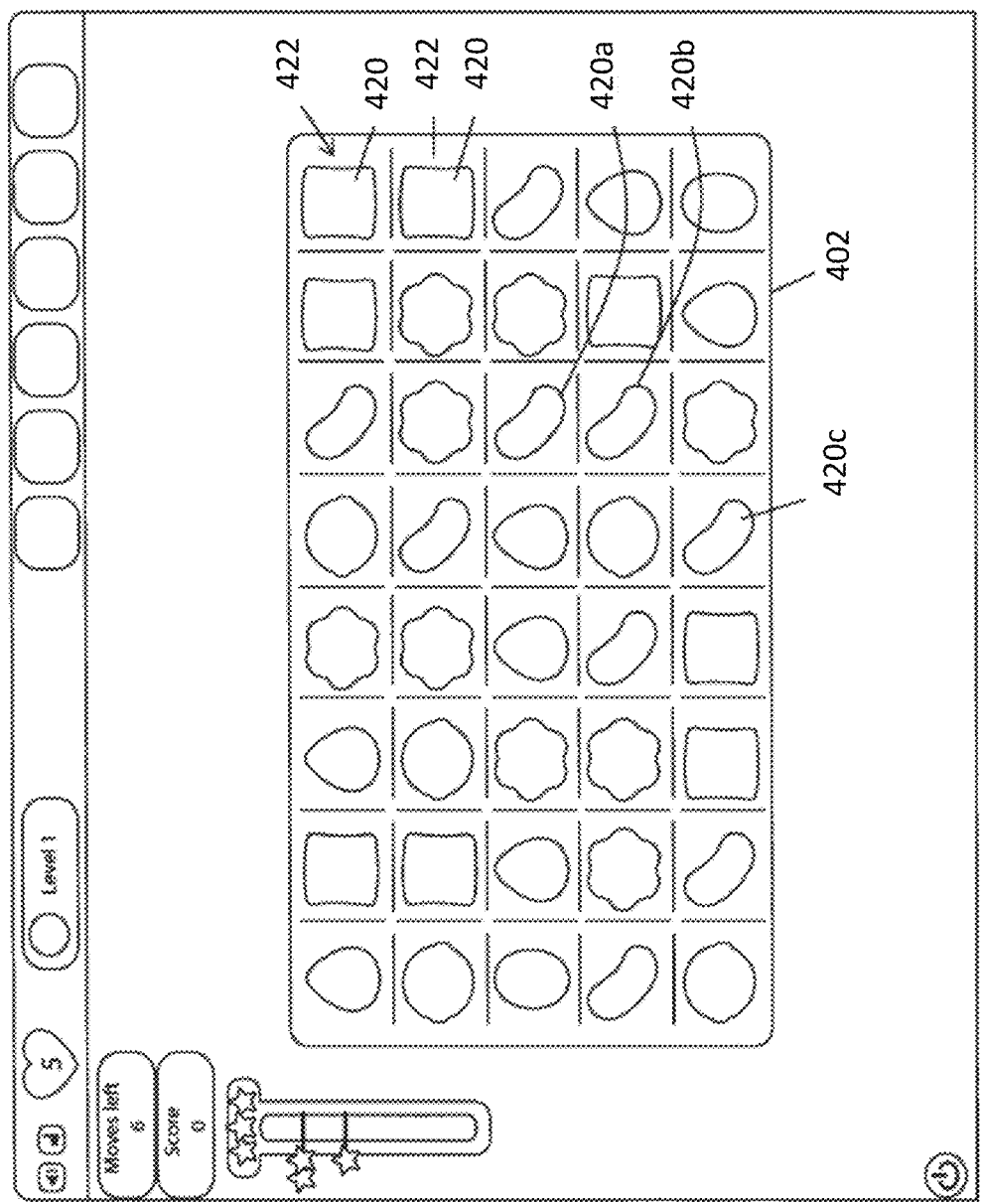
FIG. 3 shows a first example embodiment of a game board of a computer implemented game.

FIG. 3 shows a display of a known version of a match 3 switcher game called Candy Crush Saga™. FIG. 3 illustrates a game board 402 with a plurality of game elements 420. The game elements are each of six different shapes and colours. Each game element is supported by a tile 422.

The aim of the game is to swap game elements in the shape of candies with each other to make moves on the game board. To gain points the player has to make moves that create matches of at least three of the same candy. In doing so, the player gains points and the matched candies are removed. As a result new candies are provided to refill the game board. By way example, the candies may fall into place from the top in order to fill any spaces created. Assume in FIG. 3 that game element 420c is moved one place to the right to form a three-line match with game elements 420a and 420b. This has the effect of removing game elements 420a, 420b and 420c, creating a visual effect (for example an animation) on the screen to indicate the removal of the game elements. The two game elements which were directly above game elements 420a will now fall downwards into the spaces created by the removal of game elements 420a, 420b and 420c. The game elements which fall downwards into the game board are generated at random. The user then has a new game board on which to play a subsequent move. As will be described later, such a game board may be modified to provide PvP play.

Another example are the so called 'clicker' games where the player can click on a group of adjacent game elements of a certain type and those will then be removed. Some clicker games only require two adjacent elements to remove those elements if clicked by the user. Others may require more than two.

Figure 4:
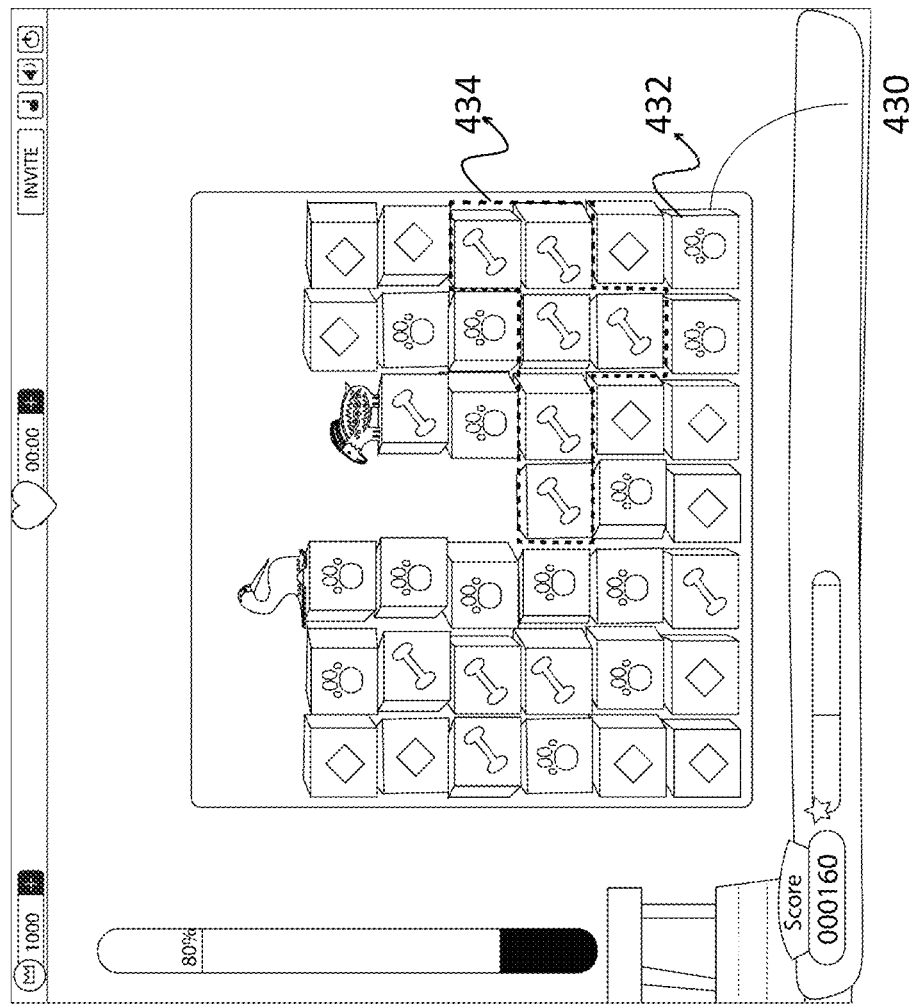
FIG. 4 shows a second example embodiment of a game board of a computer implemented game.

FIG. 4 shows a display of a known version of a clicker game called Pet Rescue™. FIG. 4 illustrates a game board 430 with a plurality of game elements or blocks 432. To play the game, the user will, via a user interface, click on any group of two or more touching blocks of the same colour. In the example shown in FIG. 4, the user has clicked on the group referenced 434 and surrounded by dotted lines. Clicking on this group will cause these blocks to be removed from the game board. In some embodiments, new blocks will not appear on the game board. The remaining game element blocks drop down and slide left to fill gaps on the game board. There may be elements blocking the game elements to fall down or slide left and the game designer may implement certain rules for certain game elements.

Another type of match games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game elements.

Another type of match game are the so called 'shooter' games where the player launches for example a ball or bubble on to the game board trying to aim at groups of similar game elements already on the game board. If the launched ball hits or forms a group of more than 3 similar game elements then that group of game elements are removed from the game board.

It is clear that embodiments may be used with any other suitable type of games. The previously described games are by way of example only.

Some embodiments may be provided in the context of so-called saga games. These are games which have one or more levels. In some games, a user may be required to complete a certain level before the user is able to progress to a next level. In some embodiments, the user may be able to go back and play any previous level. A game may have a number of different levels. Different levels may have different requirements to be met.

Figure 5:
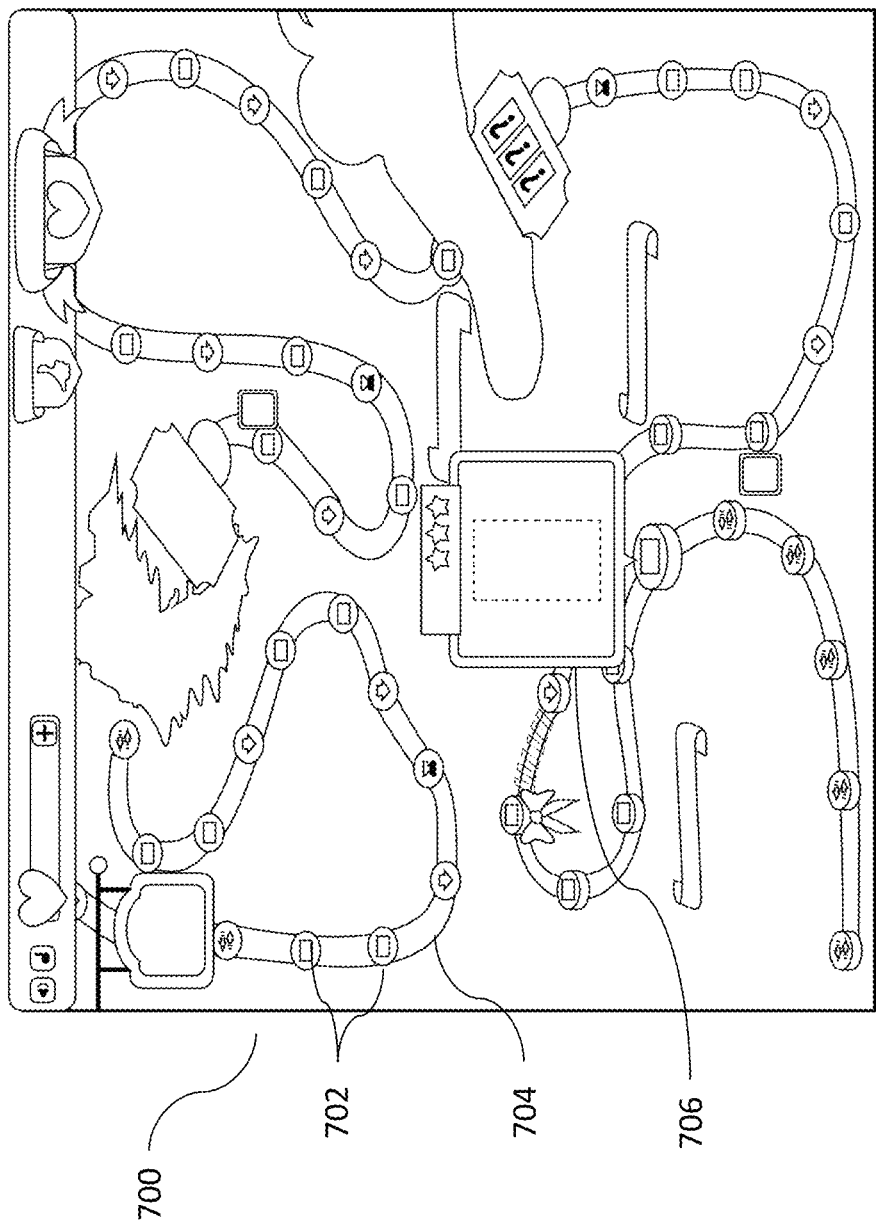
FIG. 5 schematically shows a representation of different levels of a game.

In some embodiments, the different levels may be represented on a map 700. FIG. 5 schematically shows one example of such a view. Different levels 702 are represented on a path 704 so that the user can see the progress which he has made playing the game. The different levels may be displayed in a first manner and/or with first information if the level has not been completed and in a second manner and/or with second information if the level has been completed.

In some embodiments, if the player has connected to a social network, then friends' progress from the same network may be viewed on the map by the means of information provided next to the highest level they have currently reached or by virtual of a league table which can be displayed.

In the map view, the player can hover over a level to display a thumbnail 706 of it. This makes it easier to find specific already completed levels, and can also give the player an idea of what to expect before actually starting a level.

Figure 6:
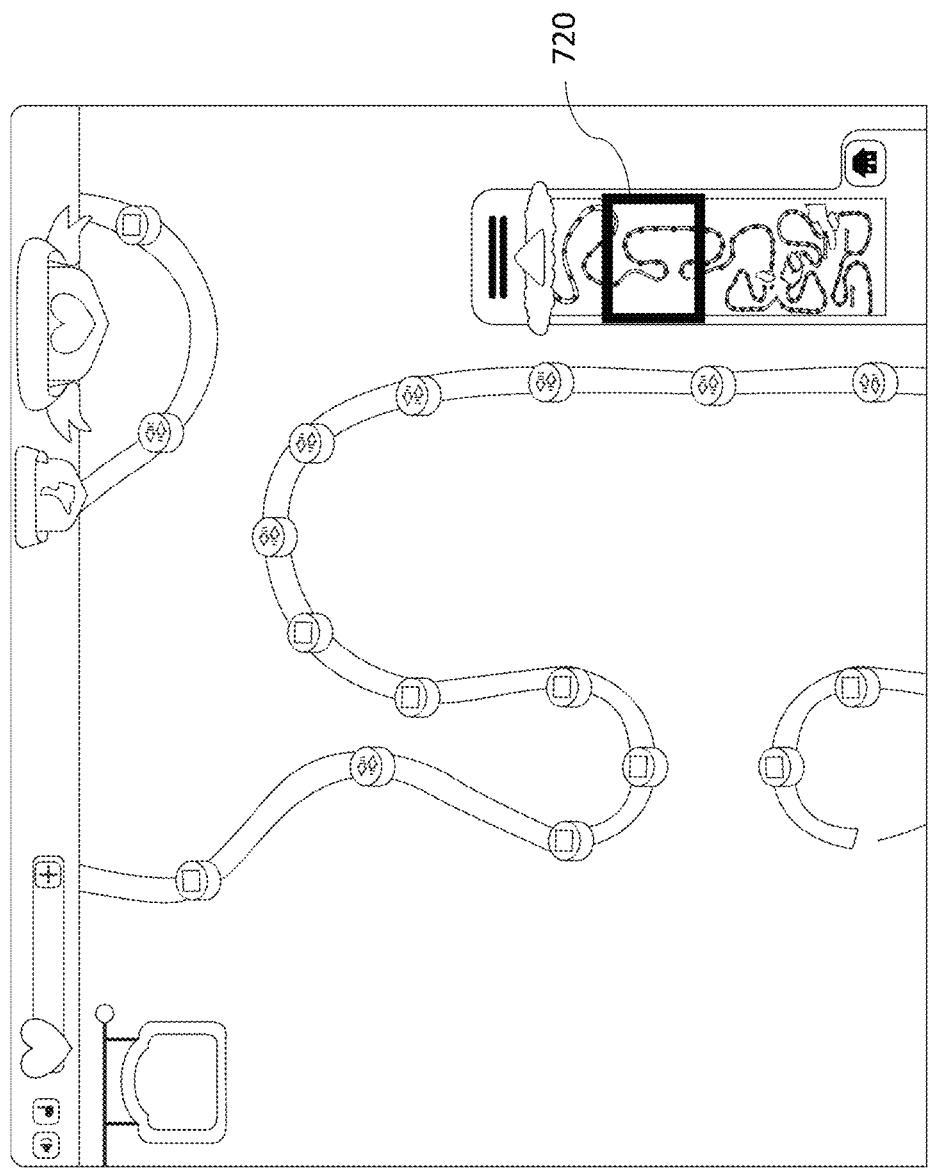
FIG. 6 schematically shows a zoomed representation of some of the different levels of the game.

When navigating on a map in a game, it may sometimes be difficult to find desired level or area of the map if the map is, for example, too large relative to the available display. In some embodiments, a smaller version 720 of the map is displayed as shown in FIG. 6. The user is able to select a part of that map to be displayed on the display such that the part of the map displayed is larger than when the entire map is displayed. The smaller version of the map will highlight the part of the map which is being displayed in enlarged from.

As the player travels through the levels in the game, his progress may be represented as a journey along a path in the virtual map.

It should be appreciated that the map representation is only one way in which progress in a game may be shown. In other embodiments, for example, a list of levels may be provided with an indication of how far in the list the player has progressed.

In some embodiments, a player is able to play against another player is a so-called PvP (player vs player) mode.

In some embodiments, one or more of these levels may provide a PvP game. In some embodiments, one or more of the levels may be a single player game. In some embodiments, the PvP mode may be provide as an option separate from the different levels shown for example on the saga map. In some embodiments, there may be only a PvP mode, with no single player option. In some embodiments, the PvP mode may be associated with different levels. In other embodiments, the PvP mode may only have a single level. In that latter scenario, there may be a plurality of different game boards.

In some embodiments, in the PvP mode players will play against each other in real time.

In some embodiments, a plurality of different of different games with different game modes may be provided. A given game mode may be associated with different game play rules and/or objectives.

In some embodiments, there may only be a single game mode.

In some embodiments, a given game mode may be associated with one or more different levels.

In some embodiments, the PvP mode is turn based. The players take actions one after each other and cannot do anything during the others turn.

In some embodiments, a turn comprises a predefined number of moves. In some embodiments, the predetermined number of moves may be one. In other embodiments, the predetermined number of moves may be two. It should be appreciated that the predetermined number of moves may be more than two. In some embodiments, different modes may be associated with different numbers of moves in a turn. In some embodiments, different levels may be associated different numbers of moves in a turn.

In some embodiments, a turn consists of two moves. In some embodiments, the player who starts will only have 1 move for the first turn, after that all turns will get 2 moves as usual. In other embodiments, the first turn may be associated with same number of moves as the other turns In some embodiments, the player may have the option of deploying an acquired item or action. The player is able to deploy the acquired action or item within a turn. In some embodiments, this may not be considered to be a move and may be additional to the predefined number of moves. In some embodiments, the deploying of the acquired action or item may use up one or more moves.

In some embodiments, each turn may have a limit in time. A player may need to make all their actions in a given amount of time. For example, the user may need to make the predefined moves and any deploying of an acquired action or item in the give amount of time. The amount of time may be any suitable value and may for example be around 30 seconds. When a player starts their turn, the at least one processor is configured to start the timer. When the timer expires or reaches a predetermined time, the at least one processor is configured to prevent the user from making any moves. This may be regardless as to whether the allocated number of moves for a turn have been used up or not.

In some embodiments, there may be a limit of turns each player has. The number of turns may depends on the level and/or game mode. The counter may be used to monitor the number of turns used up and/or remaining.

Reference is made to FIG. 7. In some embodiments, to provide user engagement, a PvP mode may not always be available. Accordingly, in some embodiments, the at least one processor of the user device may be configured to cause the display to display an image 350 such as shown in FIG. 7 or a similar indication. The image shown in FIG. 7 indicates that a PvP mode will be coming soon. In some embodiments, the information may indicate when the PvP mode will become available.

Alternatively or additionally, in some embodiments, the information may indicate to the user one or more game related criteria which need to be satisfied in order for the PvP mode to become available. For example, the user may be required to reach a particular level. Alternatively or additionally, the user may be required to play a particular number of levels within a particular time frame.

It should be appreciated that the example shown in FIG. 7 is only one way of visualising the information and in other embodiments, the information about the availability of the PvP mode in the future may be displayed in any suitable way.

It should be appreciated that in some embodiments, the information may be indicating the coming availability of a new PvP mode or the like.

It should be appreciated that providing information such as discussed in relation to FIG. 7 is optional and may be omitted in some embodiments.

In some embodiments, the user may be required to interact via the user interface with the image 350 which is displayed on the display. For example, part of the image may be a clickable option or selectable option 352. The user may be required to interact via the user interface with this selectable option in order to remove the image such as shown in FIG. 7 from the display.

In some embodiments, a PvP mode or modes may be provided in the context of a game such as previously described which has a single player is. For example as shown in FIG. 8, a so-called saga map 800 is displayed on the display with different levels 804 represented on the map. These different levels may be played by the user of the user device on his own. The user may be also provided with the option to select a PvP mode. In some embodiments, there may be an option 800 which when selected by the user via the user interface of the user device allows the PvP mode to be selected. This option 800 may be displayed in conjunction with the so-called saga map. However, it should be appreciated that this is by way of example only and in other embodiments, the PvP mode may be selected in any suitable way. As mentioned previously, in some embodiments, the PvP game mode may be the only game mode in some embodiments.

Figure 9:
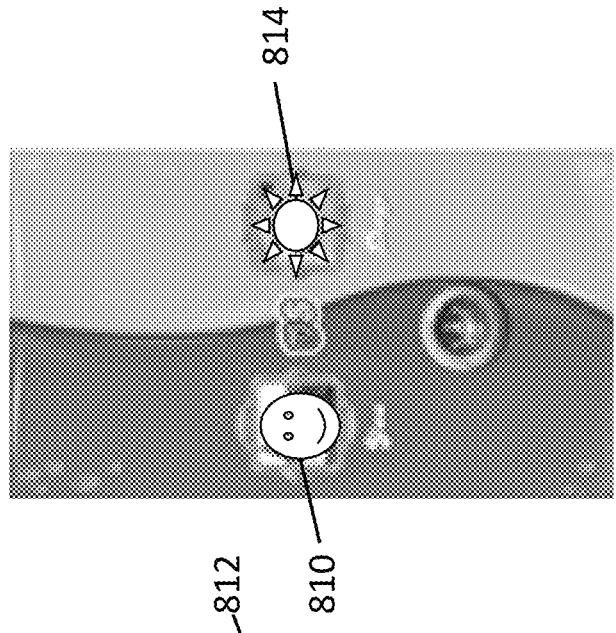
FIG. 9 shows an example of an image displayed when a player has requested an opponent.

Reference is made to FIG. 9 which shows an image which is displayed on the display of the user device when the user has selected a PvP mode and an opponent is being selected by the server for the PvP mode. As can be seen, a representation 810 of the user displayed. The representation may comprise the image of the user of the user device, an avatar associated with the user or any other image. To represent that an opponent is being searched for a continuously moving set of images 812 representing schematically possible opponents is displayed.

Figure 10:
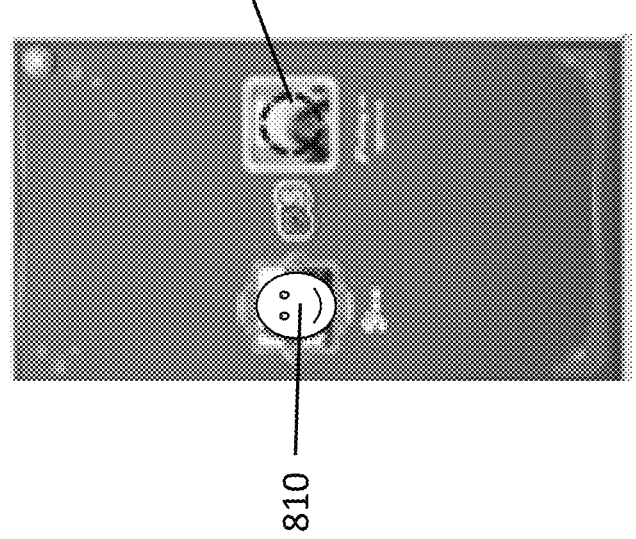
FIG. 10 shows an example of an image displayed when an opponent for a player has been found.

Reference is made to FIG. 10 which shows an image which is displayed on the display of the user device after the opponent has been selected for the PvP mode by the server. As can be seen the representation 810 of the user which is displayed in the image of FIG. 9 is also displayed in the image of FIG. 10. Additionally, a representation 814 of the opponent is displayed. The representation may comprise the image of the opponent, an avatar associated with the opponent or any other image.

Figure 12:
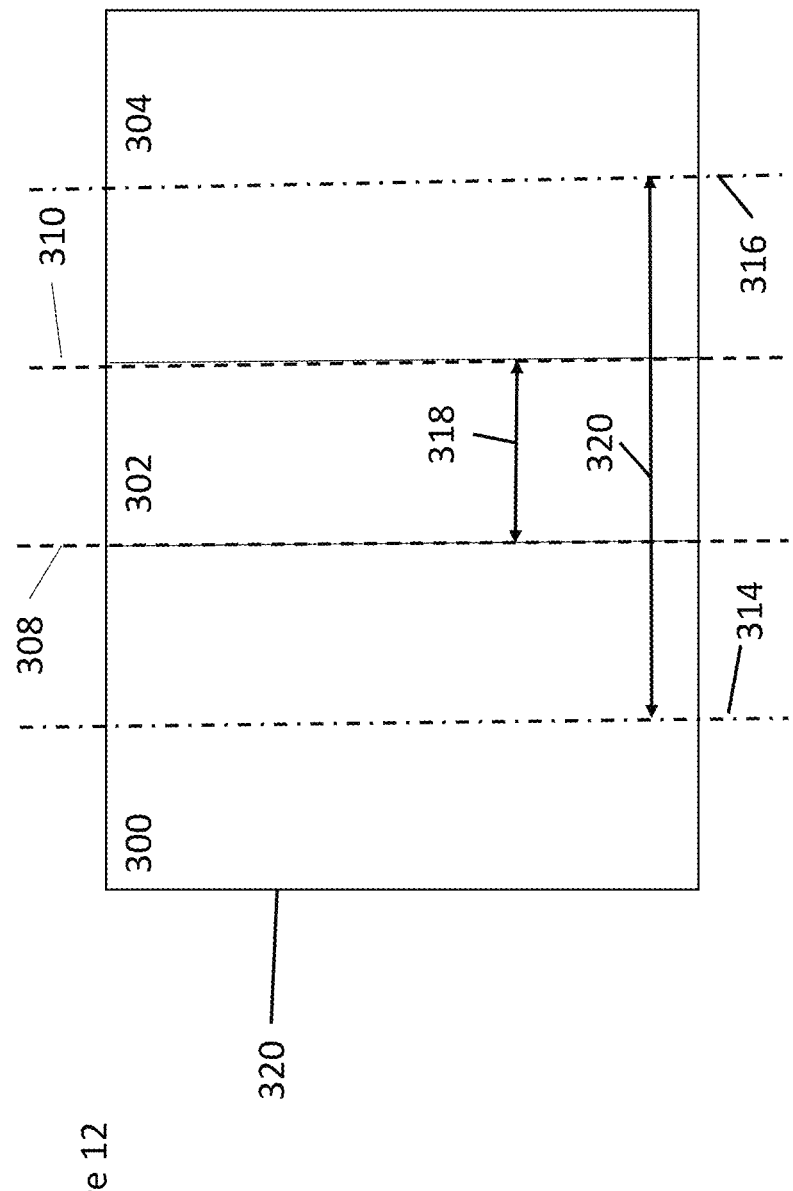
FIG. 12 schematically shows different areas of a game board in a PvP mode.

Reference is made to FIG. 12 which schematically shows a PvP game board 320 which may be used in some embodiments.

The game board may be used to support any suitable tile-matching game where the player manipulates tiles or game elements according to a matching criterion. For example, the game may be a match-three game. The tile matching may use any suitable mechanic. By way of example, the game may be a switcher game, a linker game, a clicker game or a slider game. It should be appreciated that the game board may be made up of individual game elements arranged such as shown in FIGS. 11*a* to *d* (which are described later) or in FIG. 3 or 4.

It should be appreciated that in some embodiments, both of the players will play on the same game board.

The game board 320 has a first dedicated area 300 for a first player and a second dedicated area 304 for the second player. The first and second dedicated areas are separated by a common area 302 defined between lines 308 and 310. The extent of the common area is schematically indicated by the double headed arrow 318. In the first dedicated area, only the first player is able to make a move. In the second dedicated area, only the second player is able to make a move. In the common area, both the first player and the second player are able to make a move.

The first player is able to make a move in either of the first dedicated area and the common area but not in the second dedicated area. The second player is able to make a move in either of the second dedicated area and the common area but not in the first dedicated area.

In some embodiments, the game board may be too large to be displayed all at the same time and still remain playable. This may be for example an issue when the game is played on a relatively small device such as a mobile phone or the like. Accordingly, in some embodiments, when it is the first user's turn to make a move, the area of the game board up to the dotted line 310 is displayed on the user device of the first player and the user device of the second user. This will comprise the first dedicated area 300 and the common area 302. The second user will not be able to make a move.

In some embodiments, when it is the second user's turn to make a move, the area of the game board from the dotted line 308 is displayed on the user device of the first player and the user device of the second user. This will comprise the second dedicated area 304 and the common area 302. The first user will not be able to make a move.

In some embodiments, a transition from the game board area used by the first player to the game board area used by the second player may be visualised as if a camera is panning across the game board.

Optionally, in some embodiments, when the game board is initially displayed with a visual indication of which part is associated with which user (for example such as shown in FIG. 11*a*), the initially viewed game board may be shrunk to fit onto the display.

Alternatively, only a part of the game board may be displayed. In some embodiments, the region schematically indicated by double headed arrow 320 may be displayed on the display. The region is defined by line 314 which extends through the first dedicated area and line 316 which extends through the second dedicated area. The region may be centred with respect to the common region. In this example the size of the individual game elements displayed would generally correspond to the size of the game elements which are displayed when the game is being played.

Alternatively, when the game board is initially displayed, it pans from one side to the other. The respective areas associated with the respective player may optionally be displayed with a visual indication which indicates which player is associated with which part of the game board.

In the example shown, the dedicated areas are arranged side by side. This is by way of example only and in some embodiments, the dedicated areas may be any suitable locations on the game board. In some embodiments, the dedicated areas may be arranged one above the other.

In some embodiments, there may be one or more common areas of the game board. It should be appreciated that the location of the common area may be any part of the game board. In some embodiments, a common area may be provided in a region between the two dedicated areas.

Each player may have their own playing area (and a common area in the middle).

In some embodiments, a user may make a move in their dedicated area or the common area. This will have no effect in the dedicated area of the other player. For example, a move may trigger a blaster, bomb or object associated with an action. This action may cause an effect in the current players dedicated area and/or the common area. However, this will not extend into the dedicated area of the other player.

In some alternative embodiments, a user may make a move in their dedicated area or the common area which will cause an effect in the dedicated area of the other player. For example, a move may trigger a blaster, bomb or object associated with an action. This action may cause an effect which extends into the dedicated area of the other player. (This may be in addition to an effect in the player's own dedicated area and/or the common area. A booster may be activated by one player in their dedicated area or the common area which has an effect in the dedicated area of the other player.

In one modification, the images which are displayed on the user devices are such that for both players, their dedicated area is on the same side. Effectively this means that the game boards on the two devices are mirror images in terms of positioning of the game elements. For example the user of a user device will always have the part of the game board on the right hand side of the display (or the left hand side of the display). In some embodiments, the server is configured to receive information on a move or moves made by a player on a first user device and translate that move to a corresponding move which is shown on the second user device. Thus a first user will make a move on say the left hand side of the game board which is translated to a corresponding move which is shown on the right hand side of the game board on the second user device.

FIGS. 11a to 11d show images of an example game board which is displayed at various points during a game in a PvP mode. In this example, the game board has a plurality of game elements which are arranged on background tiles. The aim of this example game is to cause the appearance of the background to change to a given colour.

This may be achieved by for example making a match where at least one game element is on a tile of a given colour. Each player may have a different colour.

In some embodiments, the tiles in the first dedicated area associated with the first player may only be changed to the given colour associated with a first player and the tiles in the second dedicated area associated with the second player may only be changed to the given colour associated with the second player. The tiles in the common area may be of either colour depending on the game play. In some embodiments, an action object or the like which is triggered by one player may have no effect in the dedicated area associated with the other player. In other embodiments, an action object or the like which is triggered by one player may have an effect in the dedicated area associated with the other player. This may be to remove game elements and/or to provide the other players background colour on one or more tiles.

One or more of the game elements may be associated with a blocker. The blockers are visualised in various different ways and generally prevent the associated game element from being used in game play until the blocker has been removed. Blockers which are provided in the common area may be removed by game play by either of the first or the second player.

FIG. 11a shows an example of a game board which is displayed on the display of the user device of both the players at the beginning of the PvP mode. This may incorporate aspects discussed in relation to FIG. 12. This visualization may be optional in some embodiments. The first dedicated area 820 is for the first player and the second dedicated area 822 is for the second player. So that each player knows which part of the game board is their game board, at the beginning of the PvP mode, an indication will be provided. In the example shown in FIG. 11a, a representation 810 and 814 of the respective players is provided on the respective parts of the game board. In other embodiments, any other suitable indication can be provided which indicates to a player which part of the game board is theirs and which part of the game board belongs to the opponent.

A common area 824 is provided between the first and second dedicated areas. In this embodiment, only the central part of the game board is shown initially. The part of the game board shown will have part of the first dedicated area, all of the common area and part of the second dedicated area.

As discussed in relation to FIG. 12, a visualization of the game board such as shown in FIG. 11a may be optional.

Figure 11C:
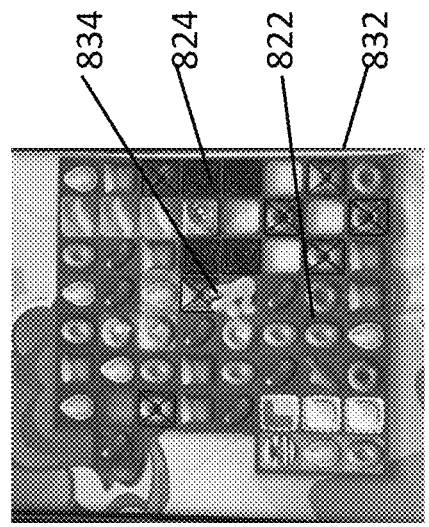
FIG. 11c shows an example of a game board displayed on a user device when the opponent is making a move.
Figure 11B:
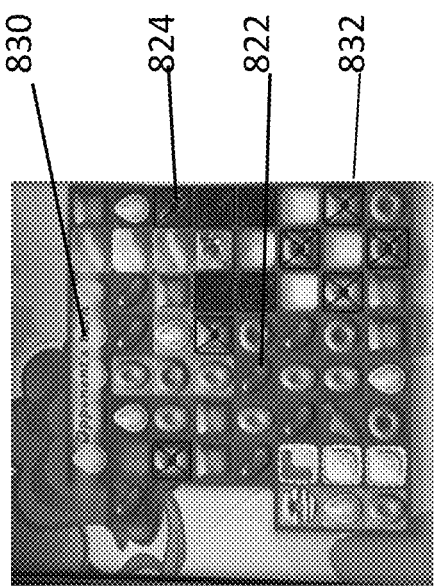
FIG. 11b shows an example of a game board displayed on a user device when it is an opponent's turn to make a move.

Reference is made to FIG. 11b which shows the image which is displayed on the user device of the first player when it is the second player's turn. In this example, a message 830 is displayed indicating that it is the second player's turn. This message may be optional in some embodiments. It should be appreciated that in some embodiments, the information that it is the second player's turn may be conveyed in any suitable way.

The part of the game board which is displayed comprises all of the second dedicated area 822 and all of the common area 824. In some embodiments, the image displayed may comprise a boundary line 832 which corresponds to the edge of the common area which bounds the first dedicated area. This is to clearly indicate the extent of the game board available to the other player.

FIG. 11c shows an example of the image which is displayed when the second player makes a move. In this example a hand 834 is visualised which selects and moves a game element. This will correspond to the actual move which is made by the second player on the second user device. This is optional in some embodiments. In other embodiments a different visualization may be used to show a move being made by the second player. In some embodiments, the game element may simply be moved on the game board shown on the display of the first user device corresponding to the move made by the second player via the second user device.

Figure 11E:
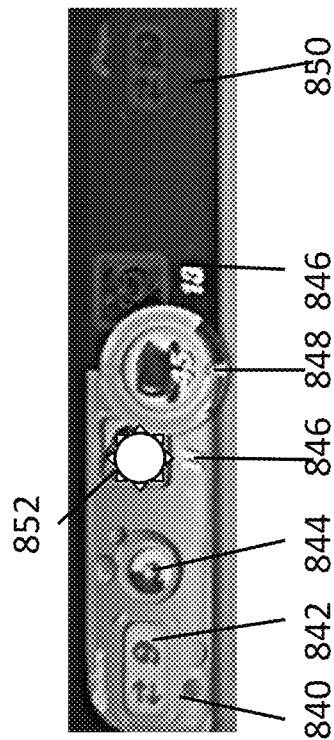
FIG. 11e shows an enlarged image of part of the information displayed on the display when the PvP game is being played.
Figure 11D:
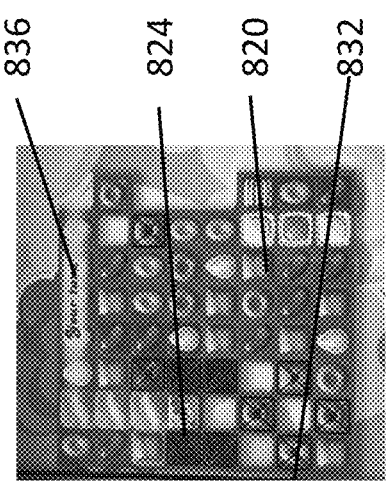
FIG. 11d shows an example of a game board displayed on a user device when it is the turn of the player associated with the user device opponent's turn to make a move.

Reference is made to FIG. 11d which shows the image which is displayed on the user device of the first player when it is the first player's turn. In this example, a message 836 is displayed indicating that it is the second player's turn. This message may be optional in some embodiments. It should be appreciated that in some embodiments, the information that it is the first player's turn may be conveyed in any suitable way.

The part of the game board which is displayed comprises all of the first dedicated area 820 and all of the common area 824. In some embodiments, the image displayed may comprise the boundary line 832 which corresponds this time to the edge of the common area which bounds the second dedicated area. This is to clearly indicate the extent of the game board available to the first player.

The first and second players take it in turn to make moves with the image displayed on the display being dependent on whose turn it is.

Reference is made to FIG. 11e which shows information which is displayed on the display along with the game board. In some embodiments, the information may be displayed above the game board. In other embodiments, this information may be displayed in any other suitable location.

The information may comprise a first part 850 which is associated with the first player and a second part 840 which is associated with the second player. In some embodiments, the parts may have the same relatively arrangement as the respective dedicated areas. In some embodiments, one of the two parts will be highlighted depending on the player whose turn it is. The other of the two parts may be at least partially greyed out.

In those embodiments where the goal is to spread a predefined colour, each part may have the respective predefined colour as a background colour.

Each part may have information 842 indicating moves. This may indicate the number of moves remaining and/or the number of moves used up.

Each part may have information 844 which indicates, when it is a given player's turn, the amount of time which has been used up and/or is remaining for that turn. This may be graphically represented in some embodiments. This may be used for example in embodiments where there is a limit on the amount of time available for a move in a turn.

Information 848 may be provided indicating a goal which when achieved wins the game. For example in this game, the goal is to cover 45 tiles with the respective colour. Information 846 may be provided indicating how close to that goal a player is. In this example, the indication may be provided by a number which may indicate the number of tiles which have the predefined colour and/or the number of tiles which need to have the predefined colour. Alternatively or additionally, a graphical representation of how close each player is to the goal may be provided.

In some embodiments, the part which is associated with the player who will have the next turn (i.e. not making the current move) may be greyed out or otherwise be less prominent. However, the information indicating how the other player is doing with respect to the goal may be shown in a prominent way. For example the information 846 of the player not making the current move may be highlighted.

It should be appreciated that the information which is displayed may be varied from the example shown in FIG. 11e. The information which is displayed may at least partially depend on the game which is being played, the goals and/or the associated required game play.

It should be appreciated that one or more of the information provided in FIG. 11e may be omitted.

It should be appreciated that in other embodiments, one or more of the information which is displayed may be displayed in any other suitable way.

In some embodiments, the tiles in the first dedicated area associated with the first player may be changed to the given colour associated with a first player and the tiles in the second dedicated area associated with the second player may be changed to the given colour associated with the second player. This will be dependent on the game play. The tiles in the common area may be of either colour depending on the game play. In some embodiments, an action object or the like which is triggered by one player may have no effect in the dedicated area associated with the other player.

In some embodiments, a player may be able to gain one or more game objects. A game object can be regarded as having an effect which assists the player in reaching a goal or hinders the opponent from reaching the goal. In some embodiments, one object may have different effects (helping the player or hindering the opponent) in dependence on where the game object is deployed. For example, if the game object is deployed in the opponents dedicated area, then the game object may hinder the opponent. If the game object is deployed in the players current playing area (common area and dedicated area), then the game object may assist the player. In other embodiments, different game objects are associated with different effects.

In some embodiments, a game object may be obtained by one or more of: playing at least a given number of moves; completing one or more levels of the associated game; playing a given number of PvP games; achieving an associated goal (which may be the same or different to the goal required to win the game); purchasing the object using in game currency; and in any other suitable manner.

The action provided by a game object may be dependent on the game being played. For example, a player may deploy a blocker in their opponent's game board. The location of the blocker may be selected by the player via the user interface or may be selected by one or more of the respective user device and the server.

In some embodiments, the user may be provided with a choice of game objects. In other embodiments, the user may be provided with a single game object to use.

In one embodiment, a player is able to gain one type of game object through one type of game play and another type of game object through a different type of game play. For example a user may be able to gain the one type of game object through making matches with n game elements having a first characteristic and the another type of game object through making matches with m game elements having a second characteristic. By way of example only, the characteristic may be colour. The values of m and n may be the same or different. In some embodiments, one type of game object may assist a player and the another game object may hinder an opponent.

In some embodiments, a player is able obtain one or more game objects as a result of game play outside the PvP mode. This may be for example during playing of levels on for example the saga map.

In some embodiments, a player may acquire a plurality of game objects. The player may be able to select one or more of the game objects to be deployed during a turn.

In some embodiments, when a user selects a game object via the user interface to hinder his opponent, the at least one processor may be configured to cause the display to display the opponents game board area to be displayed on the display. The user, via the user interface then deploys the game object on the opponent's game board. Information about this move is sent to the server. The server will then send information about this deployment to the user device of the opponent, The at least one processor is configured to display the opponents game board with a visual indication showing the deployment of the game object. This visual indication may, for example, be similar to that shown in FIG. 11c or any of the discussed alternatives. The indication may indicate that the deployment is by the current player's opponent.

In some embodiments a player may have a win streak which is the number of consecutive wins in the PvP mode. This win streak may be used to rank players on a leader board or the like. In some embodiments, when a user loses a PvP game, the user is provided with one or more options to prevent the win streak from being lost. For example a user may be able to replay the game with the same or a different competitor.

In some embodiments, a reward may be provided when the user has x consecutive wins. When the user has y more consecutive wins, a different reward may be provided. X and y may be the same or different. There may of course be further rewards when a given number of further consecutive wins have been acquired.

In some embodiments, a reward may be provided when the user has x consecutive wins. The consecutive number of wins will be reset. When the user has z consecutive wins, a different reward may be provided. X and z may be the same or different. In some embodiments z is greater than x. In some embodiments, once the user has achieved a reward for x wins, the user is not able to acquire any reward again for acquiring x wins. Rather the next reward may only be available once z consecutive wins have been achieved. Similarly, once the reward for z wins has been acquired, there may be a new target number of wins to acquire a reward. There may of course be further rewards when a given number of consecutive wins have been acquired.

The dedicated areas of the two player may broadly be similar.

In some embodiments, the dedicated areas of the game boards provided to each player may be the same.

In some embodiments, the dedicated areas of the game boards provided to one player may be a mirror image of that provided to the other player in terms of game element positioning. This may be the case where the common area is provided between the two dedicated areas.

In some embodiments, the dedicated areas of the game boards may have the same layout but have different game element and/or blocker positioning. For example the dedicated areas of the game boards may have been populated with game elements using different seeds.

In some embodiments, the dedicated areas of the two players may be different. The dedicated areas may have different layouts and/or different content and/or support different game modes.

In some embodiments, one or more of the dedicated areas may be dependent on a current level of a user.

In some embodiments, to provide a common gaming experience for the users, a PvP mode may require the players to play $2n$ games to determine a winner, where n is an integer. For example, the players may be required to play each one of the dedicated areas of the game board before a winner is determined. The dedicated areas of the game boards may be of a different difficulty or the same difficulty. In some embodiments, points or the like would be accumulated by playing each of the different dedicated areas of the game boards and the player with the highest total across both dedicated areas of the game boards may be the winner.

In some embodiments, the dedicated areas of the PvP game boards may be associated with different levels. In some embodiments, each player may be provided with a next available level in that player's individual progress. In some embodiments, the next level may be dependent on progress by game play by the respective player within the PvP mode. In other embodiments, the next level may be dependent on game play by the respective player within for example the saga map or the like. In other embodiments, the level of the PvP game boards provided to given players may be selected according to any suitable characteristic.

Different levels are not necessarily of different difficulties although this may be the case in some embodiments. In some embodiments, for example, different levels may be associated with different goals, different game boards, different game elements and/or the like.

In some embodiments, the server may match players which are on the same level. In some embodiments, the server may match players which are on levels which have a similar difficulty rating. In some embodiments, the server may match players based on their skill level and an associated difficulty of the level. For example, the server may match one player having a relatively high skill level with a relatively difficult dedicated area of the game board with another player having a relatively low skill level with a relatively easy dedicated area of the game board.

In some embodiments, the server may select the dedicated area of the game board without regard to the skill and/or progress of the players.

Figure 13:
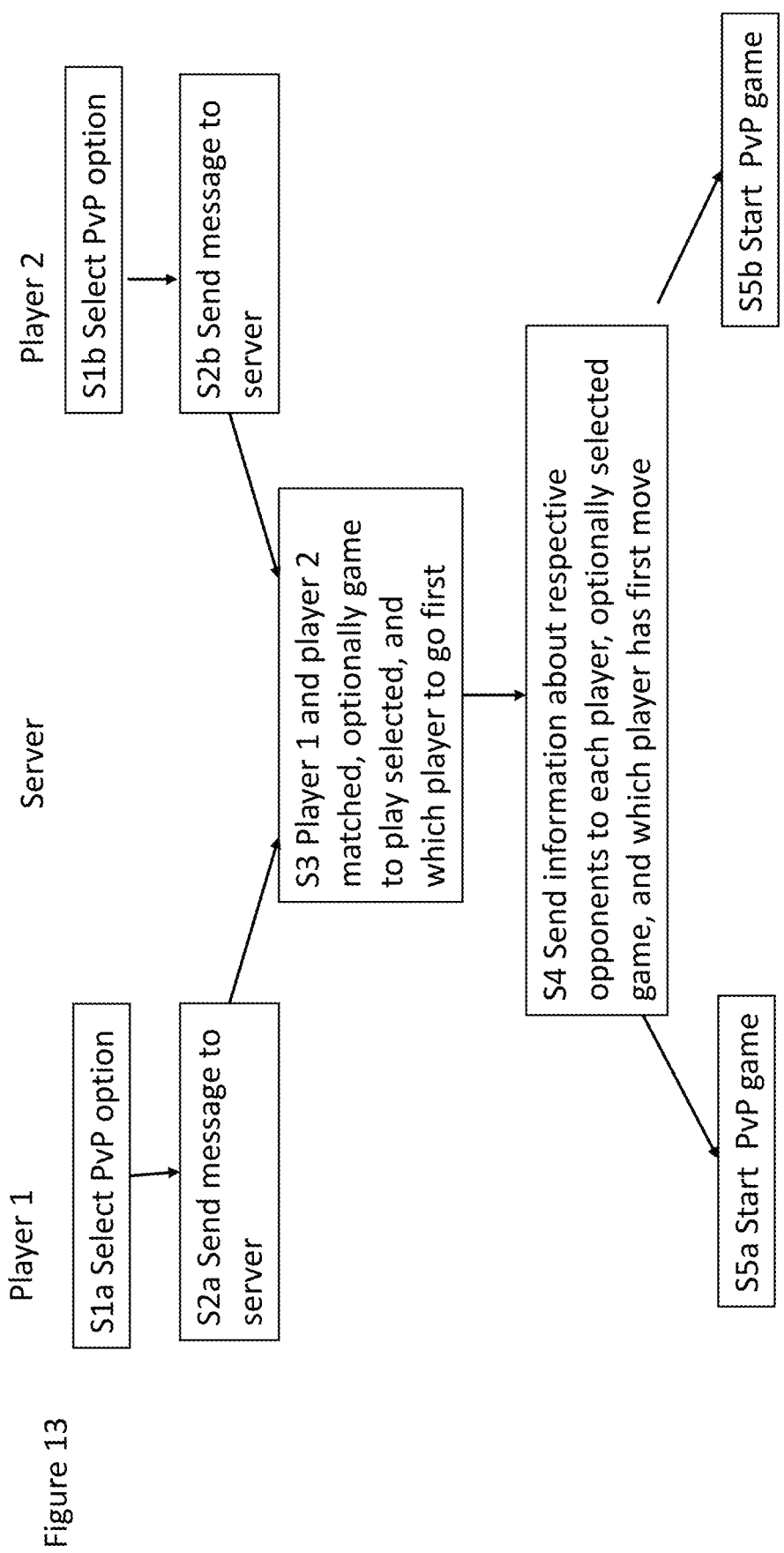
FIG. 13 shows a method of some embodiments to set up a PvP mode.

Reference is made to FIG. 13 which shows a method of some embodiments. The steps of FIG. 13 show the steps required to set up a PvP game between a first player, player 1 using a first user device and a second player, player 2 using a second user device.

In step S1*a*, the first player interacts with the user interface of the first user device to select a PvP option. This may be as previously described. When the user interacts with user interface of the user device, this may cause the at least one processor to cause the display to display an image such as shown in FIG. 5 on the display. It should be appreciated that this is by way of example only, and the at least one processor may be configured to cause the display to display any other suitable image which indicates that the PvP mode has been selected and optionally that an opponent is being looked for.

In step S2*a*, the at least one processor of the first user device is configured in response to the selection of the PvP option to cause the transmitter of the user device to send a message to the server. This message will indicate that the first player has selected the PvP option.

It should be appreciated that steps S1*b* and S2*b* will be performed in the second user device. Steps S1*b* and S2*b* correspond to steps S1*a* and S2*a* which are performed with respect to the first user device.

It should be appreciated that the steps S1*a* and S2*a* may be performed generally at the same time as steps S1*b* and S2*b*. However, these steps S1*a* and S2*a* do not need to be performed at exactly the same time as steps S1*b* and S2*b*. It should be appreciated that steps S1*a* and S2*a* and steps S1*b* and S2*b* may be performed within a common time window.

In step S3, the server is configured to receive the messages provided from the first user device and the second user device. In practice, the server may be receiving a relatively large number of messages from different user devices. Each of these messages will indicate that the respective users of the respective user devices have selected the PvP mode. In step S3, the server will match pairs of users from the received messages. In this example, the first player and the second player are matched.

The server may use any suitable criteria when deciding how to match the two users. The users may be matched based on their skill levels and/or progress levels. Alternatively or additionally the users may be matched based on other criteria such as location of the users, social network connections, interests of the user and/or the like.

In some embodiments, where the PvP option has been selected, there may be a plurality of different available games or levels of the game. In such embodiments, the server may select the game or level which is to be played by the two players. This may take into account a current level of a player and/or other game play data associated with a respective user. This information may be stored in a database or memory and retrieved as required by the server.

In alternative embodiments, when a user selects the PvP option they are also selecting a particular game or level of the game to be played. In this option, the message which are sent from the respective user device to the server may include information on the particular game or level of the game to be played. This is so that the server can match users which are to play the same game together.

In other embodiments, the PvP option may be associated with a single game.

The server may make a decision as to which of the players is to go first. This can be done on any suitable criteria. For example, the server may select the user which interacted a first with the particular device to select a PvP option. Alternatively, the server may use history information to ensure that a particular user is able to be go first in roughly 50% of the cases, where possible. This option will require the server to store this information and to retrieve that information when making a decision as to which player is to go first.

In step S4, the server is configured to send information about the respective opponent to each player. Accordingly, the server will send a message to the first user device indicating that the second player is the opponent. Likewise, the server will send it to the second user device information indicating that the first player is the opponent. In some embodiments, the message which is sent to the respective user device may include an image or avatar of the opponent.

Where the server has selected the game or level to be played, the server will also provide that information to each of the user devices.

Where the server has selected which player is to make the first move, this information will be provided to the respective user devices.

In step 5a, the receiver of the first user device receives the message from the server and this is provided to the at least one processor. The at least one processor is configured in response to the message to cause the PvP game to be started. This may comprise displaying information on the display about the opponent and/or a game board which is to be played. The first user device is also provided with information indicating if the first player associated with the first user device is to have the first move or not. The manner in which the game board is displayed and/or the ability of the user to interact with the game board may depend on whether the first player is to have the first move or not.

It should be appreciated that step S5b corresponds to step S5a but is performed in the second user device.

Reference is made to FIG. 14 which shows a method of playing a PvP game. It should be appreciated that in some embodiments the method shown in FIG. 11 may follow on from the method shown in FIG. 13.

In the example shown in FIG. 14, the first player associated with the first user device has the first move. Accordingly, in step S6, the at least one processor is configured to cause the display to display a game board with which the user is able to interact via the user interface to make the first move. The player may be permitted a predetermined number of moves in a turn. The predetermined number of moves may be one or more. In response to the move or moves made, the at least one processor is configured to update the game board which is displayed on the display.

In step S7, the at least one processor is configured to cause the transmitter of the user device to send a message to the server with an update. In some embodiments, this message will be sent when the first players turn has been considered to be completed or when the user provides an input via the user interface which explicitly indicates that the turn is complete. For example, when there are a limited number of moves associated with a turn, the at least one processor will cause the transmitter to send the message when the number of moves reaches this limited number. For example, the at least one processor may be configured to cause the display to display an option which when selected indicates that the turn has been completed. In other embodiments, information from the first device may be transmitted to the server any time the user interacts with the game board This message sent by the first user device may indicate the move(s) made by the user and/or the updated game board. In some embodiments, the updated game board is sent by the first user device to the server. In other embodiments, information about the move itself is sent to the server.

In step S8, the update is received by the server. The server is configured to determine if the game has ended. It should be appreciated that there may be a limitation on the total number of moves available in a game, a limitation on the amount of time for which the game is payable or there is a criteria which needs to be met for the game to be considered to have ended. The server may determine whether any of the criteria for considering the game to have been ended has been completed.

It should be appreciated that in other embodiments, the determination as to whether or not a game may has been completed may be made in the respective user device. For example, after the player has made his move in step S6, the at least one processor of the user device may be configured to determine if the game has been ended. If so, this information is included in the update sent to the server.

In step S8, the server is configured to send one or more updates to the second user device. As discussed, the updates may be sent when a turn has ended or each time the user interacts with the game board. This update will include information about the moves made by the user and/or interactions with the game board. The information may comprise an updated game board or information about the particular moves made by the user. The information may comprise information about whether a game has ended, if this is determined by the server.

In step S9, the second user device is configured to receive the message from the server. In response to this message, the at least one processor is configured to cause the game board which is displayed on the display of the second user device to be updated to reflect the moves made by the first player.

In step S10, the second player is configured to determine if the game has ended. This may be based on information which has been received from the server indicating that the game has ended or a determination made in the user device.

If it is determined in step S10 that the game has ended, then the next step will be step S13 where the at least one processor is configured to end the game and to display a result. That result may be to indicate whether the second player has won or lost the game or if the game has been drawn.

If it is determined in step S100 that the game has not ended, then the next step is made is step S11. It should be appreciated that step S11 corresponds to step S6, but takes place in the second user device.

S11 is followed by step S12 which corresponds to step S7 but takes place in the second user device Step S12 is followed by step S14 which takes place in the server. Step S14 generally corresponds to step S8 but is in respect of the information received from the second user device.

Step S15 corresponds generally to step S9 but takes place in the first user device. Step S15 is followed by step S16 which corresponds generally to step S10 but which takes place in the first user device.

If it is determined that the game has ended, then the next step is step S17 which generally corresponds to step S13 but takes place on the first user device. If it is determined in step S16 that the game has not ended, then the next step is step S6.

It should be appreciated that if it is determined in step S8, that the game has ended, this information is also sent to the first user device where the next step would be step S16.

Likewise if it is determined in step S14, that the game has ended, this information is also sent to the second user device where the next step would be step S10.

In some embodiments, the players take turns to make a predetermined number of moves. The player whose turn it is has to complete their turn before the other player is permitted to make their move.

In the example shown in FIG. 11, the goal is for the tiles to have the predefined colour. Other embodiments may alternatively or additionally be to collect a given number of items, move one or more items to a given location, release one or more items, remove one or more items from the game board, achieve a given number of points and/or any other suitable goal.

It should be appreciated that where the goal involves one or more items, the item type may be the same or different for the two players.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device configured to provide a computer implemented game, the computer device comprising a display, a user interface, and at least one processor, the at least one processor being configured to:
provide a game board of a computer implemented game, the game board comprising a first dedicated area associated with a first player using the computer device and a second dedicated area associated with a second player using a different computer device and a common area, the game board in the first dedicated area, the common area and the second dedicated area comprising game elements arranged on respective background tiles, game elements in the first dedicated area and the common area being selectable by the first player to provide a respective match with one or more other game elements of the game board and game elements in the common area and the second dedicated area being selectable by the second player to provide a respective match with one or more other game elements of the game board;
determine that it is a turn of the first player to make a move in the computer implemented game;
cause the display to display a first game board area for the first player comprising the first dedicated area and at least a part of the common area when it is determined that it is the first player's turn;
receive user input from the first player via the user interface selecting a game element of the game board to make a match with at least one other game element of the game board;
in response to a match being made, cause a respective background tile associated with one or more game elements of the match to have a given characteristic associated with the first player;
determine that it is a turn of the second player to make a move in the computer implemented game; and
cause the display to display a second game board area for the second player comprising the second dedicated area and at least a part of the common area when it is determined that it is the second player's turn, the second game board area being different to the first game board area, wherein a match made responsive to the move made by the second player selecting a game element of the game board to make a match with at least one other game element of the game board causes a respective background tile associated with one or more game elements of the match to have a given characteristic associated with the second player, different to the given characteristic of the first player.

2. The computer device as claimed in claim 1, wherein the at least one processor is configured to cause the display to display the common area between the first dedicated area and the second dedicated area.

3. The computer device as claimed in claim 1, wherein the at least one processor is configured to cause the display to pan across the game board at a beginning of the computer implemented game.

4. The computer device as claimed in claim 1, wherein the at least one processor is configured to cause the display to display information indicating which area of the game board is associated with which of the first and second players.

5. The computer device as claimed in claim 1, wherein the at least one processor is configured to cause the display to pan from showing the first dedicated area to the second dedicated area.

6. The computer device as claimed in claim 1, wherein the at least one processor is configured when a turn of one of the first and second players is completed to cause the image displayed on the display to pan from showing the first dedicated area to the second dedicated area.

7. The computer device as claimed in claim 1, wherein the at least one processor is configured to cause the display to initially display only a part of the first dedicated area and only a part of the second dedicated area.

8. The computer device as claimed in claim 1, wherein the at least one processor is configured to cause the display to display information indicating if it is the first player's turn or the second player's turn.

9. The computer device as claimed in claim 1, wherein the game board has a plurality of game elements, each game element comprising one of a plurality of different characteristics, the user interface being configured to receive an input from the first player when it is the first player's turn to select at least one game element and the at least one processor is configured to determine based on the selected at least one game element if a valid move has been made.

10. The computer device as claimed in claim 9, wherein the at least one processor is configured to determine that an invalid move has been made when the at least one selected game element is determined to be provided in the second dedicated area.

11. The computer device as claimed in claim 1, wherein the given characteristic is a first characteristic in the first dedicated area and a second characteristic in the second dedicated area.

12. The computer device as claimed in claim 11, wherein the given characteristic is either of the first characteristic and the second characteristic in the common area.

13. The computer device as claimed in claim 12, wherein the at least one processor is configured to determine if it is the first player's turn or the second player's turn and in dependence on this determination, determine if the given characteristic is the first characteristic or the second characteristic in the common area.

14. The computer device as claimed in claim 1, wherein the user interface is configured to receive at least one input to select at least one game object and deploy the game object on the game board.

15. The computer device as claimed in claim 14, wherein the game object when deployed at least one of assists the first player when playing the computer implemented game and hinders the second player when playing the computer implemented game.

16. The computer device as claimed in claim 14, wherein the at least one processor is configured to determine that the game object is to be deployed in the second dedicated area and in response cause the display to display at least the second dedicated area.

17. The computer device as claimed in claim 14, wherein the at least one processor is configured to determine that the game object is to be deployed in the second dedicated area in dependence on one or more characteristics of the game object.

18. A computer implemented method provided on a computer device, the computer device configured to provide the computer implemented the method comprising:
provide, by at least processor of the computer device, a game board of a computer implemented game, the game board comprising a first dedicated area associated with a first player using the computer device and a second dedicated area associated with a second player using a different computer device and at least one common area, the game board in the first dedicated area, the common area and the second dedicated area comprising game elements arranged on respective background tiles, game elements in the first dedicated area and the common area being selectable by the first player to provide a respective match with one or more other game elements of the game board and game elements in the common area and the second dedicated area being selectable by the second player to provide a respective match with one or more other game elements of the game board;
determining by the at least one processor that it is a turn of the first player to make a move in the computer implemented game;
causing, by the at least one processor, a display of the computer device to display a first game board area for the first player comprising the first dedicated area and at least a part of the common area when it is determined that it is the first player's turn;
receiving user input from the first player via the user interface selecting a game element of the game board to make a match with at least one other game element of the game board;
in response to a match being made causing a respective background tile associated with one or more game elements of the match to have a given characteristic associated with the first player;
determining by the at least one processor that it is a turn of the second player to make a move in the computer implemented game; and
causing, by the at least one processor, the display of the computer device to display a second game board area for the second player comprising the second dedicated area and at least a part of the common area when it is determined that it is the second player's turn, the second game board area being different to the first game board area, wherein a match made responsive to the move made by the second player selecting a game element of the game board to make a match with at least one other game element of the game board causes a respective background tile associated with one or more game elements of the match to have a given characteristic associated with the second player, different to the given characteristic of the first player.

19. A non-transitory computer readable medium comprising computer executable instructions, which when run by at least one processor are configured to cause a computer:
provide a game board of a computer implemented game, the game board comprising a first dedicated area associated with a first player using a computer device and a second dedicated area associated with a second player using a different computer device and at least one common area, the game board in the first dedicated area, the common area and the second dedicated area comprising game elements arranged on respective background tiles, game elements in the first dedicated area and the common area being selectable by the first player to provide a respective match with one or more other game elements of the game board and game elements in the common area and the second dedicated area being selectable by the second player to provide a respective match with one or more other game elements of the game board;
determine that it is a turn of the first player to make a move in the computer implemented game;
cause a display of the computer device to display a first game board area for the first player comprising the first dedicated area and at least a part of the common area when it is determined that it is the first player's turn;
receive user input from the first player via the user interface selecting a game element of the game board to make a match with at least one other game element of the game board;
in response to a match being made, cause a respective background tile associated with one or more game elements of the match to have a given characteristic associated with the first player;
determine that it is a turn of the second player to make a move in the computer implemented game; and
cause the display of the computer device to display a second game board area for the second player comprising the second dedicated area and at least a part of the common area when it is determined that it is the second player's turn, the second game board area being different to the first game board area, wherein a match made responsive to the move made by the second player selecting a game element of the game board to make a match with at least one other game element of the game board causes a respective background tile associated with one or more game elements of the match to have a given characteristic associated with the second player, different to the given characteristic of the first player.

* * * * *